(12) United States Patent
Xing et al.

(10) Patent No.: US 11,861,840 B2
(45) Date of Patent: Jan. 2, 2024

(54) SYSTEM AND METHOD FOR EXTRACTING PLANAR SURFACE FROM DEPTH IMAGE (71) Applicant: SHANGHAITECH UNIVERSITY, Shanghai (CN)

(72) Inventors: Ziran Xing, Shanghai (CN); Zhiru Shi, Shanghai (CN); Yi Ma, Shanghai (CN); Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 471 days.

(21) Appl. No.: 17/219,555

(22) Filed: Mar. 31, 2021

(65) Prior Publication Data
US 2021/0241462 A1 Aug. 5, 2021

Related U.S. Application Data (63) Continuation of application No. PCT/CN2019/110546, filed on Oct. 11, 2019, and a
(Continued)

(51) Int. Cl.
*G06T 7/11* (2017.01)
*G06T 7/162* (2017.01)
(Continued)

(52) U.S. Cl.
CPC ............... *G06T 7/11* (2017.01); *G06T 7/162* (2017.01); *G06T 7/187* (2017.01); *G06T 7/50* (2017.01); *G06T 2207/10028* (2013.01)

(58) Field of Classification Search
CPC . G06T 7/11; G06T 7/162; G06T 7/187; G06T 7/50; G06T 2207/10028;
(Continued)

(56) References Cited

U.S. PATENT DOCUMENTS 10,832,487 B1 * 11/2020 Ulbricht ............... G06T 7/30
2010/0265316 A1 10/2010 Sali et al.
(Continued)

FOREIGN PATENT DOCUMENTS

CN 101969564 A 2/2011
CN 104463856 A 3/2015
(Continued)

OTHER PUBLICATIONS

PCT International Search Report and the Written Opinion dated Jan. 3, 2020, issued in related International Application No. PCT/CN2019/110546 (7 pages).

*Primary Examiner* — Nimesh Patel
(74) *Attorney, Agent, or Firm* — Bayramoglu Law Offices LLC (57) ABSTRACT According to some embodiments, an imaging processing method for extracting a plurality of planar surfaces from a depth map includes computing a depth change indication map (DCI) from a depth map in accordance with a smoothness threshold. The imaging processing method further includes recursively extracting a plurality of planar region from the depth map, wherein the size of each planar region is dynamically adjusted according to the DCI. The imaging processing method further includes clustering the extracted planar regions into a plurality of groups in accordance with a distance function; and growing each group to generate pixel-wise segmentation results and inlier points statistics simultaneously.

20 Claims, 8 Drawing Sheets

Related U.S. Application Data continuation of application No. PCT/CN2018/109795, filed on Oct. 11, 2018.

(51) Int. Cl.
 *G06T 7/187* (2017.01)
 *G06T 7/50* (2017.01)

(58) Field of Classification Search
 CPC ... G06T 2207/20021; G06T 7/12; G06T 7/74; G06T 2207/30244; G06T 9/00; G06T 15/205; G06T 2207/10012; G06T 2207/20084; G06T 17/00; G06T 2207/10048; G06T 2207/10052; G06T 7/13; G06T 2207/20212; G06T 7/00; G06T 2207/20081; G06T 7/85; G06T 9/001; G06T 1/0014; G06T 19/20; G06T 15/00; G06T 2207/30261; G06T 2207/30196; G06T 7/246; G06T 7/33; G06T 2200/04; G06T 7/10; G06T 7/292; G06T 1/0007; G06T 13/20; G06T 7/136; G06T 7/155; G06T 7/143; G06T 7/174; G06T 7/73; G06T 7/77; G06T 2207/10024; G06T 2207/20221; G06T 2207/10016; G06T 19/006; G06T 5/001; G06T 5/002; G06T 7/44; G06T 7/55; G06T 7/593; G06T 7/80; G06T 19/00; G06T 15/10; G06T 2207/10072; G06T 7/0002; G06T 7/215; G06T 7/285; G06T 7/62; G06T 7/97; G01S 13/89; G01S 17/89; G01S 13/865; G01S 13/867; G01S 19/42; G01S 15/8984; G01S 15/8977; G01S 15/8979; G01S 13/426; G01S 15/8995; G01S 7/4808; G01S 7/412; G01S 7/20; G01S 17/42; G01S 15/89; G01S 17/88; G01S 15/8993; G01S 17/894; G01S 7/4817; G01S 7/497; G01S 17/86; G01S 17/93; G01S 7/4815; G01S 7/5205; G01C 21/3848; G01C 21/28; G01C 21/30; G01C 21/367; G06F 3/04845; G06F 3/017; G06F 3/04815; G06F 3/011; G06F 18/24; G06F 16/29; G06F 18/22; G06F 18/2413; G06V 40/28; G06V 20/64; G06V 10/764; G06V 10/82; G06V 20/49; G06V 10/464; G06V 10/757; G06V 20/52; G06V 40/161; G06V 40/172; G06N 20/00; G06N 3/045; G06N 3/04; G06N 3/044; G06N 3/047; G06N 3/08; G06N 3/084; G11B 20/10527; G11B 2020/10611; G11B 2020/10814; G11B 2020/10944

See application file for complete search history.

(56) References Cited

U.S. PATENT DOCUMENTS

| | | | | |
|---|---|---|---|---|
| 2014/0232820 | A1* | 8/2014 | Ha | H04N 13/261 348/43 |
| 2016/0198097 | A1* | 7/2016 | Yewdall | H04N 5/272 348/659 |
| 2017/0076142 | A1* | 3/2017 | Chang | G06T 7/11 |
| 2018/0027224 | A1* | 1/2018 | Javidnia | G06T 7/593 382/154 |
| 2018/0202814 | A1* | 7/2018 | Kudrynski | G01C 21/30 |
| 2021/0019892 | A1* | 1/2021 | Zhou | G06V 40/161 |

FOREIGN PATENT DOCUMENTS

| | | |
|---|---|---|
| CN | 104463948 A | 3/2015 |
| CN | 106981068 A | 7/2017 |
| CN | 107862735 A | 3/2018 |

* cited by examiner

SYSTEM AND METHOD FOR EXTRACTING PLANAR SURFACE FROM DEPTH IMAGE

CROSS-REFERENCE TO RELATED APPLICATIONS

This application claims priority of International Patent Applications No. PCT/CN2018/109795, filed on Oct. 11, 2018, and PCT/CN2019/110546, filed on Oct. 11, 2019 (PCT/CN2018/109795 was abandoned and refiled as PCT/CN2019/110546). The above-referenced applications are incorporated herein by reference in their entirety.

TECHNICAL FIELD

The present invention relates to computer vision, and more particularly, to system and method for extracting planar surface from depth image.

BACKGROUND

Reliable and real-time planar surface extraction based on 3D depth sensors is a crucial component in computer vision applications such as mobile robotics. Once these surfaces have been successfully detected, one can apply mapping and localization at a high accuracy and high speed since the tracked planes not only can reduce the size of the map but also help remove noisy geometry of the environment. However, extracting planes in real-time remains challenging, for example, when small planar structures are urged to be perceived, or when the mobile robotics are deployed in hostile environments such as in poor lighting or texture-less conditions.

SUMMARY

To address the issues in the prior art, embodiments of the present disclosure provide a method for extracting the maximum consensus set from a large-scale dataset containing corrupted data.

In one aspect, an imaging processing method for extracting a plurality of planar surfaces from a depth map includes computing a depth change indication map (DCI) from a depth map in accordance with a smoothness threshold. The imaging processing method further includes recursively extracting a plurality of planar region from the depth map, wherein the size of each planar region is dynamically adjusted according to the DCI. The imaging processing method further includes clustering the extracted planar regions into a plurality of groups in accordance with a distance function; and growing each group to generate pixel-wise segmentation results and inlier points statistics simultaneously. In some embodiments, the number of groups is minimum, and the total number of pixels to the plurality of groups is maximum, and the plane fitting error is less than a predefined threshold.

In some embodiments, the imaging processing method further includes measuring the smoothness of each planar region using a summed-area table (SAT) on DCI, where a mean square error (MSE) of each planar region is less than an MSE threshold ($T_{MSE}$), and a curvature of each planar region is less than a curvature threshold ($T_{cuv}$).

In some embodiments, the imaging processing method further includes clustering the extracted planar regions into a plurality of groups using a designed auto balanced search tree (AST).

BRIEF DESCRIPTION OF THE DRAWINGS

To better illustrate the technical features of the embodiments of the present disclosure, various embodiments of the present invention will be briefly described in conjunction with the accompanying drawings.

DETAILED DESCRIPTIONS OF THE EMBODIMENTS

Figure 1A:
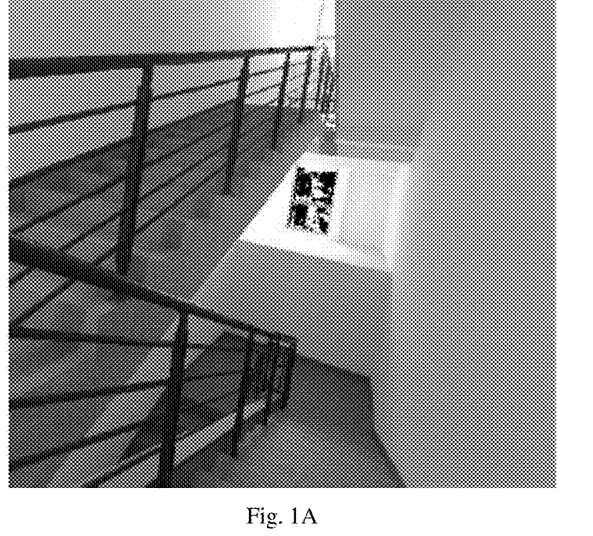
FIGS. 1A, 1B, 1C, and 1D show graphical illustrations of planar surface extraction from a depth image, according to various embodiments of the present disclosure.
Figure 1B:
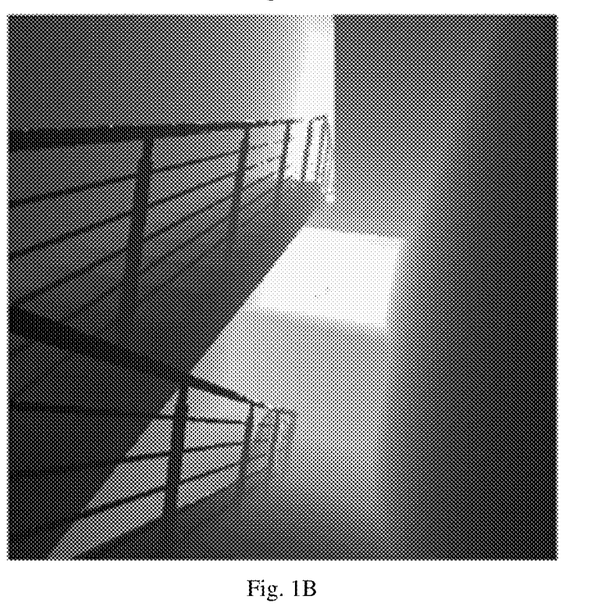
Figure 1C:
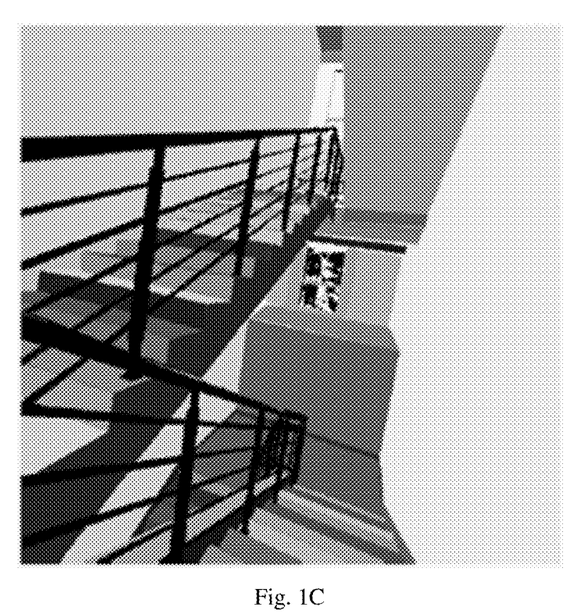
Figure 1D:
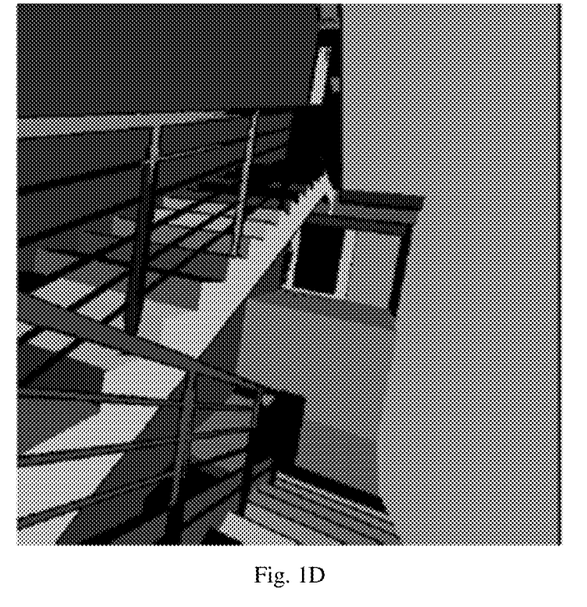

Extracting planes in real-time remains challenging. On the one hand, one needs to maintain a minimum rate of miss-detection and over-detection. On the other, sufficient inliers have to be obtained in order to accurately estimate the planar parameters. FIGS. 1A, 1B, 1C, and 1D show a classic example of plane extraction from an image. FIG. 1A is an RGB image of a scene. FIG. 1B is the corresponding depth image. FIG. 1C is the human labeled planar regions where each color represents a physical plane. FIG. 1D is the plane detection result generated by our algorithm. A staircase is composed of multiple partially occluded planar surfaces and is particularly challenging to state-of-the-art solutions. Prior techniques tend to either miss small-scale planes or incorrectly splits a large plane into multiple, smaller ones.

In this disclosure, systems and methods for extracting one or more planar surfaces from depth image are disclosed. In some embodiments, a real-time algorithm is used to extract multi-scale planar surfaces in real-time. The algorithm first dynamically divides the depth image into rectangle regions, where points in each region lie on a common plane. Then the algorithm generates planar primitives by clustering these regions into some distinct groups according to their plane parameters. Finally, the pixel-wise segmentation results are achieved by growing each distinct group. The advantages of the disclosed systems and methods comprise: (1) a reduction of the number of regions to be clustered and improved plane fitting accuracy, because of the dynamic region size adjusting algorithm; (2) is guaranteeing the worst-case time complexity to be log-linear, because of the region clustering algorithm; and (3) superior performance of the disclosed algorithm than the state-of-art method in quality and speed (the disclosed algorithm runs an order of magnitude faster).

In this disclosure, the plane extraction problem can be formulated as: given a depth image D, the goal is to detect a set of planes $\{G_i\}$, $i \in \{1, 2, \ldots k\}$ where each pixel of D can be classified into $\{G_i\}$, and a set of non-planes B so that:
(1) The size of set $\{G_i\}$ is minimum;
(2) The total number of pixels assigned to $\{G_i\}$ is maximum; and
(3) For every pixel assigned to $G_i$, the plane fitting error should be less than a predefined threshold.

Existing techniques on depth images can be classified into three categories: direct clustering, RANSAC (Random Sample Consensus) and region growing. Direct clustering groups every input point in terms of their estimated surface normal values. Under severe occlusions, reliably estimating surface normals from point locations is particularly challenging: the size of the area (neighborhood) one picks for estimating the normal affects greatly the final results. The existing approach is also slower as it often requires using grid discretization in the normal space where high precision corresponds to fine discretization and hence slower speed. Though the classical RANSAC algorithm is able to conduct plane fitting, it is even more computationally costly, especially on a scene with multiple planes.

The key idea of region grown-based algorithms is to expand the seed region until the fitting error exceeds certain thresholds. Various existing techniques have been proposed to handle different type of regions, e.g., 3D voxels vs. 2D rectangular regions. Such existing techniques include, for example, an efficient algorithm to detect planes in unorganized point clouds. It first partitions the entire 3D space into a large number of small voxels and then performs clustering by merging the seed with its nearest 26 voxels. The Agglomerative Hierarchical Clustering (AHC) is a 2D region growing method. It first uniformly divides the entire image as small grids and then builds a priority queue for tracking the best seed region yielding to the minimum plane fitting error. Once a seed region is successfully fetched, AHC then searches for its four neighbor grids to see if any region can be merged with seed. After merging, AHC re-inserts the merged grid into a priority queue and re-fetch the new best seed. The process repeats until the queue is empty.

The AHC approach has two major limitations: it is difficult to select the proper grid size and it cannot deal with heavy occlusions. The former directly affects the ability to extract small or non-uniform planar surfaces such as stairs: one can set the grid size to be very small (e.g., 4×4) to improve robustness at the cost of much higher computational cost (see details in the experiment section). The latter is inherently due to the existence of multi-scale planar regions. In particular, it is unable to group disconnected regions. Conceptually, one can apply RANSAC to resolve the grouping problem but at a much higher computational cost.

To at least mitigate the above-described disadvantage of existing technologies in plane extraction, in this disclosure, a novel region growing technique is disclosed for ultra-fast and reliable planar surface detections (see FIGS. 2A-2E). Compared with existing technologies, the advantages of the disclosed approach include:
(1). The disclosed systems and methods reduce the number of regions to be clustered and improve the plane fitting accuracy through dynamic region size adjusting (see Algorithm 1 below for details). Comparing to the methods using uniform region size, the disclosed algorithm will not lose any useful information and will not harm the time complexity;
(2). The disclosed systems and methods overcome the plane splitting problem (usually due to the occlusion) by clustering all extracted seed regions into some distinct groups (see Algorithm 2 below). By employing a designed auto-balanced search tree, the complexity of this clustering algorithm is log-linear at the worst case; and
(3). The disclosed systems and methods conduct several comprehensive experiments, which show that the disclosed algorithm outperforms the existing method in quality and speed (the disclosed algorithm runs an order of magnitude faster).

Figure 2A:
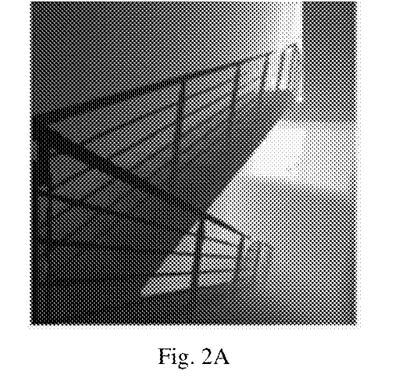
FIGS. 2A, 2B, 2C, 2D, and 2E show graphical illustrations of an exemplary method for extracting planar surface from depth image, according to various embodiments of the present disclosure.
Figure 2B:
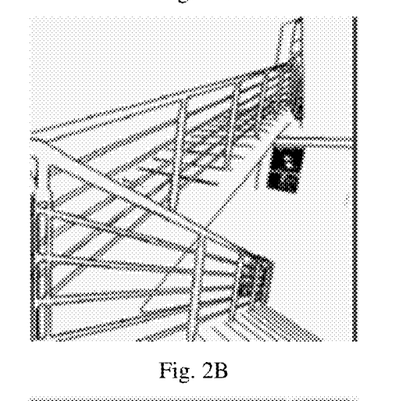
Figure 2C:
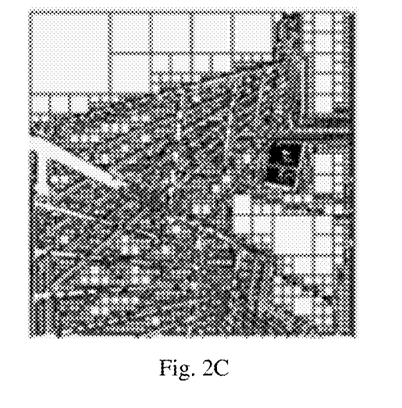
Figure 2D:
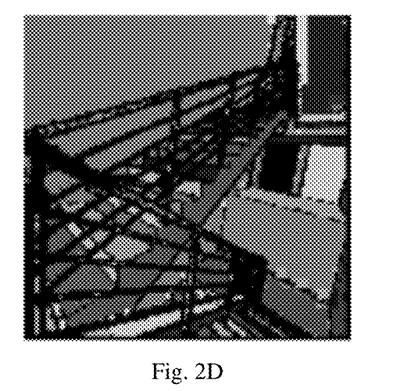
Figure 2E:
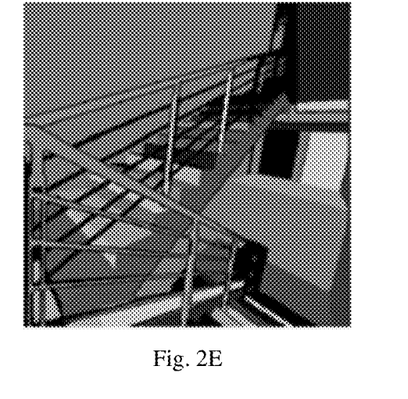

FIGS. 2A, 2B, 2C, 2D, and 2E are graphical illustrations of an exemplary method for extracting planar surface from depth image, according to various embodiments of the present disclosure. FIG. 2A is an input depth image. FIG. 2B is the Distance Change Indication (DCI) map generated based on FIG. 2A, wherein the black pixels stand for the non-smooth region. FIG. 2C shows the planar region extraction results, wherein the size of each region is dynamically adjusted according to the DCI. FIG. 2D is the result after planar region clustering step. FIG. 2E is the pixel-wise segmentation result based on FIG. 2D. The overall pipeline of the disclosed algorithm is shown in FIGS. 2A-2E for fast plane detection from a depth image. In some embodiments, a recursive region extraction algorithm is put forward to divide the depth image into planar regions (see FIG. 2C), then these regions are clustered into distinct groups by a designed auto-balanced search tree (see FIG. 2D). Finally, the plane proposal of the whole image is verified by region growing to produce the pixel-wise segmentation (see FIG. 2E).

Recursive Planar Region Extraction

In some embodiments, the planar region in the disclosed algorithm is defined as a rectangle area in the depth image, in which each point lies on a common plane in 3D space. The disclosed algorithm extracts such regions to estimate plane normals and distances, which are the most intrinsic parameters to combine discrete planar fragments.

An existing approach is to divide the entire image into many small non-overlapping grids, then fit a plane for each small grid. The trickiest part is to decide the size of the grids. With a small grid size, the plane parameters estimation will be inaccurate, and the running time will be significantly increased. However, the algorithm is hard to perceive the small planar such as stairs when setting a large gird size.

To overcome such difficulties in existing technologies, a recursive planar region extraction algorithm (described in Algorithm 1 below) is disclosed. In some embodiments, a depth change indication map (DCI) is used to constrain the extracted region. A plane is fitted for an area in which depth changes are smooth. When MSE (mean square error) and curvature of plane fitting are small enough, this area is considered to be a planar region. The advantage of Algorithm 1 is that the recursive strategy can dynamically adapt to the DCI, i.e., the size of each region can be dynamically determined. The efficiency and accuracy can be improved since the algorithm always tries to preserve the large regions which can help to reduce the number of regions and increase the plane fitting accuracy. An intermediate result of this step is shown in FIG. 2C.

Algorithm 1: Dynamically generate planar regions

```
1   Function ExtractAllPlanarRegions(D, T_smooth, T_minSize, T_MSE, T_cuv)
    |   //  verify the depth smoothness of each pixel by eq(1)
2   |   DCI = ComputeDCI(D, T_smooth);
3   |   sDCI = ComputeSAT(DCI);                    // compute summed area table for DCI
    |   //  generate 9 SATs for fast covariance matrix computation [13]
4   |   sC = CacheCovariance(D);
5   |   R_init = (0, 0, D.Width, D.Height);        // initial region is the whole image
6   |   PlanarRegions = Ø;
7   |   PlanarRegionExtraction(PlanarRegions, sC, DCI, R_inst, T_minSize, T_MSE, T_cuv):
9   |   return PlanarRegions
10  end
    //  recursively extract planar regions from depth image
11  Function PlanarRegionExtraction(PlanarRegions, sC, sDCI, R_cur, T_minSize, T_MSE, T_cuv)
    |   //  T_minSize means the minimum size of accepted planar regions
12  |   if R_cur.Width < T_minSize or R_cur.Height < T_minSize then
14  |   |   return;
15  |   else
    |   |   //  get the number of smooth pixels in R_cur
16  |   |   CntSmoothPixels = getSumOfRegion(sDCI, R_cur);
    |   |   //  verify the definition of smooth region see eg(2)
17  |   |   if CntSmoothPixels = R_cur.Width × R_cur.Height then
    |   |   |   //  we use the O(1) method proposed in [13]
    |   |   |   (MSE, Cuv) = PlaneFitting(xC, R_cur):
19  |   |   |   if MSE ≤ T_MSE and Cuv ≤ T_cuv then
    |   |   |   |   PlanarRegions = PlanarRegions + {R_cur};
22  |   |   |   |   return
23  |   |   |   end
24  |   |   end
    |   |   //  split current region R_cur into 4 parts and recursive on each of them
25  |   |   R_lu = LeftUpQuarter(R_cur);
26  |   |   R_lb = LeftBottomQuarter(R_cur):
27  |   |   R_ru = RightUpQuarter(R_cur);
28  |   |   R_rb = RightBottomQuarter(R_cur);
29  |   |   PlanarRegionExtraction(PlanarRegions, sC, sDCI, R_lu, T_minSize, T_MSE, T_cuv);
30  |   |   PlanarRegionExtraction(PlanarRegions, sC, sDCI, R_lb, T_minSize, T_MSE, T_cuv);
31  |   |   PlanarRegionExtraction(PlanarRegions, sC, sDCI, R_ru, T_minSize, T_MSE, T_cuv);
32  |   |   PlanarRegionExtraction(PlanarRegions, sC, sDCI, R_rb, T_minSize, T_MSE, T_cuv);
33  |   end
34  end
```

In some embodiments, the DCI is defined as $$DCI(u,v) = \begin{cases} 1 & \max_{(m,n) \in F} |D(u,v) - D(m,n)| \leq f(d(u,v)), \\ 0 & \text{otherwise,} \end{cases} \quad (1)$$

where $F = \{(u-1, v), (u+1, v), (u, v-1), (u, v+1)\}$, $f(\cdot)$ is the smoothness threshold function, and $D(u, v)$ represents the depth value at pixel location $(u, v)$. Common methods can be used to computing the DCI.

In some embodiments, the following steps can be implemented to analyze the performance of the recursive planar region extraction. Per Algorithm 1, the main computational tasks in each recursive call are to verify if current region is smooth and estimate the plane parameters. Formally, a smooth region R is a rectangle in DCI which satisfied $$|R| = \sum_{(u,v) \in R} DCI(u,v) \quad (2)$$

where $|R|$ denotes the size of region R.

Based on equation (2), region smoothness check can be performed in O(1) time by simply applying a summed-area table (SAT) on DCI. For plane parameter estimation, the SAT can also be used to accelerate the covariance matrix C computation. The plane normal n is the eigenvector which corresponds to the smallest eigenvalue of C. The region MSE and curvature is defined as $$MSE(R) = \frac{1}{|R|} \sum_{p_{(u,v)} \in R} (n \cdot p_{(u,v)} + d)^2 = \frac{\lambda_0}{|R|} \quad (3)$$

$$\text{Curvature}(R) = \frac{\lambda_0}{\lambda_0 + \lambda_1 + \lambda_2} \quad (4)$$

where $\lambda_0$, $\lambda_1$, $\lambda_2$ are eigenvalues of covariance matrix C (increasing order) and $C \cdot n = \lambda_0 \cdot n$.

With T(n) denoting the worst-case running time on recursive extracting planar regions which contains n points, it can be obtained that $T(n) \leq 4 \times T(n/4) + O(1)$. It is verified that $T(n) = O(n)$. If the resolution of input depth map is W×H, then the overall worst-case time complexity of Algorithm 1 is O(W×H) since computing DCI and SAT are both cost O(W×H).

Cluster the Extracted Regions by Auto-Balanced Search Tree

In some embodiments, the planar regions generated by the previous step will be treated as plane proposals for the current depth image. However, examining every planar region will cause lots of unnecessary operations since many regions are corresponding to a common 3D plane. In order to reduce the number of plane proposals and improve the estimation accuracy, a cluster algorithm is indispensable. The distance function in parameter space is defined as $$\chi(G_1, G_2) = \begin{cases} 1 & \begin{cases} \|n_1 - n_2\|_\infty \leq T_{norm.} \\ |d_1 - d_2| \leq T_{dist} \end{cases} \\ 0 & \text{otherwise,} \end{cases} \quad (5)$$

where $\{n_1, d_1\}$ and $\{n_2, d_2\}$ are plane parameters corresponding to planar region groups $G_1$ and $G_2$ respectively.

The aim of clustering algorithm is to classify all planar regions into several groups:

$$\{G_1, G_2, \ldots, G_k\}$$

$$s.t. \; \forall i,j \in \{1,2, \ldots k\},$$

$$\chi(G_i, G_j) = 0 \qquad (6)$$

For convenience, such a group set can be referred to as a distinct set. In some embodiments, a fast cluster algorithm based on a designed auto-balanced search tree (AST) is disclosed. The overall algorithm is shown as Algorithm 2. The disclosed cluster algorithm can produce a distinct set. FIG. 2D shows an exemplary output of this step.

---

Algorithm 2: Clustering all planar regions

---

1  Function ClusterAllPlanarRegions(PlanarRegions, $T_{norm.}$, $T_{dist}$)
2  |  AST = ∅;
3  |  for each R ∈ PlanarRegions do
4  |  |  G = {R};
5  |  |  AddOneItem(AST, G, $T_{norm.}$, $T_{dist}$);
6  |  end
8  |  return AST
9  end

---

In some embodiments, it is important for AST to maintain balance after insertion and deletion. Any planar region can be represented as $n \cdot p_{(u,v)}(u,v) \; d=0$. Where n is a three-dimensional unit vector specifying the plane normal, and d is a non-negative number specifying the distance from origin to the plane. In order to efficiently search a region by its n and d, an AST is built by cascading four Red-black trees (three for normal n and one for distance d, see FIG. 3, in which each branch is constructed by a Red-Black tree). The pseudo-code for adding one item in AST is shown as algorithm 3. Due to the excellent property of the red-black tree, the AST can maintain balance after each operation and the worst time complexity of searching, inserting and deleting are O(log(|AST|)). The pseudo-codes of these operations are given in Algorithms 6, 7, and 4.

---

Algorithm 3: Add one plane region group to AST

---

1   Function AddOneItem(AST, $G_{new}$, $T_{norm.}$, $T_{dist}$)
    |  //  $P_{AST}$ stand for the location of $G_{nearest}$ in AST
2   |  ($G_{nearest}$, $P_{AST}$) = FindNeares(AST, $G_{new}$, $T_{norm.}$, $T_{dist}$);
3   |  if Gnearest = ∅ then
4   |  |  Insert($P_{AST}$, $G_{new}$)
5   |  else
6   |  |  $G_{merge}$ = MergeTwoGroups($G_{new}$, $G_{nearest}$):
7   |  |  Delete($P_{AST}$):
8   |  |  AddOneItem(AST, $G_{merge}$, $T_{norm.}$, $T_{dist}$):
9   |  end
11  |  return AST
12  end
13  Function MergeTwoGroups($G_1$, $G_2$)
14  |  $G_{merge}$.Regions = $G_1$.Regions + $G_2$.Regions:
15  |  $G_{merge}$.PlaneParams = PlaneFitting($G_{merge}$.Regions):
    |  //  The following step is to prevent inaccurate plane fitting
    |     caused by strip-like region shape [4]

---

Algorithm 3: Add one plane region group to AST (-continued)

---

16  |  if $G_{merge}$.PlaneParams is not satisfy equation (7) then
17  |  |  if |$G_1$.Regions| < |$G_2$.Regions| then
18  |  |  |  $G_{merge}$.PlaneParams = $G_2$.PlaneParams;
19  |  |  else
20  |  |  |  $G_{merge}$.PlaneParams = $G_1$.PlaneParams;
21  |  |  end
22  |  end
23  end

---

Algorithm 4: Delete one item from AST

---

1   Function Delete($P_{AST}$)
2   |  if $P_{AST}$.Dist.size( ) > 1 then
3   |  |  DeleteInRBTree($P_{AST}$.Dist, $G_{new}$);
4   |  else
5   |  |  EraseRBTree($P_{AST}$.Dist);
6   |  |  if $P_{AST}$.Nz.size( ) > 1 then
7   |  |  |  DeleteInRBTree($P_{AST}$.Nz, $G_{new}$);
8   |  |  else
9   |  |  |  EraseRBTree($P_{AST}$.Nz):
10  |  |  |  if $P_{AST}$.Ny.size( ) > 1 then
11  |  |  |  |  DeleteInRBTree($P_{AST}$.Ny, $G_{new}$);
12  |  |  |  else
13  |  |  |  |  EraseRBTree($P_{AST}$.Ny);
14  |  |  |  |  DeleteInRBTree($P_{AST}$.Nx, $G_{new}$);
15  |  |  |  end
16  |  |  end
17  |  end
18  end

---

Algorithm 5: Pixel-wise Segmentation

---

1   Function PixelWiseSegmentation (AST, $T_{inlier}$)
2   |  LabelMap = ∅;
    |  //  sorting by the number of points
    |      in each group
3   |  𝒢 = SortDistinctGroups (AST,'decrease');
4   |  for each G ∈ 𝒢 do
5   |  |  Q = ∅ ;   //  Q is a queue
6   |  |  for each R ∈ G do
7   |  |  |  for each pixel p ∈ R do
8   |  |  |  |  if LabelMap(p) = ∅ then
9   |  |  |  |  |  LabelMap(p) = G:
10  |  |  |  |  end
    |  |  |  |  //  $B_R$ is the boundry of R
11  |  |  |  |  if p ∈ $B_R$ then
12  |  |  |  |  |  Q.push(p);
13  |  |  |  |  end
14  |  |  |  end
15  |  |  end
16  |  |  while Q ≠ ∅ do
17  |  |  |  p = Q.pop( );
    |  |  |  //  $F_p$ is set of 4 neighbors of p
18  |  |  |  for each f ∈ $F_p$ do
19  |  |  |  |  if LabelMap(f) = ∅ then
20  |  |  |  |  |  if |G.n · f + G.d| < $T_{inlier}$ then
21  |  |  |  |  |  |  LabelMap(f) = G;
22  |  |  |  |  |  |  Q.push(f);
23  |  |  |  |  |  end
24  |  |  |  |  end
25  |  |  |  end
26  |  |  end
27  |  end
29  |  return LabelMap
30  end Algorithm 6: Find nearest neighbor in AST

```
1  Function FindNearest(AST, G_new, T_norm, T_dist)
2  |  G_nearest = Ø;
3  |  P_AST.Nx = AST.Nx;
4  |  P_AST.Ny =FindInRBTree(P_AST.Nx, G_new, T_norm.);
5  |  if P_AST.Ny ≠ NULL then
6  |  |    P_AST.Nz =FindInRBTree(P_AST.Ny, G_new, T_norm.);
7  |  |    if P_AST.Nz ≠ NULL then
8  |  |    |    P_AST.Dist =FindInRBTree(P_AST.Nz, G_new, T_norm.);
9  |  |    |    if P_AST.Dist ≠ NULL then
10 |  |    |    |    G_nearest =FindInRBTree(P_AST.Dist, G_new, T_dist);
11 |  |    |    end
12 |  |    end
13 |  end
15 |  return G_nearest, P_AST
16 end
```

Algorithm 7: Insert one item to AST

Figure 3:
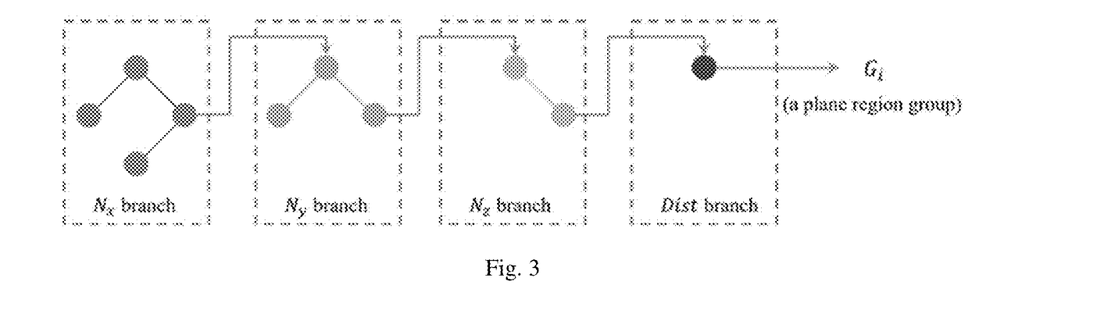
FIG. 3 shows a graphical illustration of an exemplary auto-balanced search tree (AST) algorithm, according to various embodiments of the present disclosure.

```
1  Function Insert(P_AST, G_new)
2  |  if P_AST.Ny = NULL then
3  |  |    Insert InNxBranch(P_AST, G_new);
4  |  |    if P_AST.Nz = NULL then
5  |  |    |    InsertInNyBranch(P_AST, G_new);
6  |  |    |    if P_AST.Dist = NULL then
7  |  |    |    |    InsertInNzBranch(P_AST, G_new);
8  |  |    |    else
9  |  |    |    |    InsertDistBranch(P_AST, G_new);
10 |  |    |    end
11 |  |    end
12 |  end
13 end
   //  The key idea is to maintain the
       AST structure shown in Fig. 3
14 Function InsertInNxBranch(P_AST, G_new)
15 |  P_AST.Dist = new DistTree;
16 |  InsertInRBTree(P_AST.Dist, G_new);
17 |  P_AST.Nz = new NzTree;
18 |  InsertInRBTree(P_AST.Nz, P_AST.Dist);
19 |  P_AST.Ny = new NyTree;
20 |  InsertInRBTree(P_AST.Ny, P_AST.Nz);
21 |  InsertInRBTree(P_AST.Nx, P_AST.Ny);
22 end
```

In some embodiments, it is claimed that when Algorithm 2 is finished, $\nabla G_j$, $G_j \in AST$, $\chi(G_i, G_j)=0$. In order to show this claim is correct, the lemma that adding a new item by calling Algorithm 3 will preserve the property of a distinct AST is to be proved. The claim is true if the lemma is true.

The correctness of this lemma can be demonstrated by induction. The base case is trivial, when $AST=\emptyset$, it is correct obviously. The inductive hypothesis is that the property of a distinct AST with size k−1 will be kept after calling Algorithm 3. The inductive step is to verify if the distinct property is still maintained when inserting a new item into a distinct AST with size k. The inductive step is tested under two cases: the first one is that the new added item $G_{new}$ cannot merge with its nearest neighbor $G_{nearest}$ in AST, the second one is the opposite. In the first case, Algorithm 3 will directly insert $G_{new}$ into AST, and it is still distinct. In the second case, Algorithm 3 will first delete $G_{nearest}$ from AST (deletion will not harm the property), and the size of AST will reduce to k−1. According to the inductive hypothesis, adding $G_{new}$ into the current AST will still preserve its property. Based on these two cases, the inductive step is shown to be true, i.e., the lemma is true.

In some embodiments, the worst-case running time of Algorithm 3 is $O(\log(|AST|))$. There are two different situations when adding a new item into AST as above-mentioned. The first one takes one searching and inserting operation in $O(\log(|AST|))$. The running time of the second one highly depends on the plane merge function. Per Algorithm 3, the parameters after merging must satisfy:

$$\begin{cases} n_m^x \in [n_{min}^x, n_{max}^x] \\ n_m^y \in [n_{min}^y, n_{max}^y] \\ n_m^z \in [n_{min}^z, n_{max}^z] \\ d_m \in [d_{min}, d_{max}] \end{cases} \quad (7)$$

Figure 4:
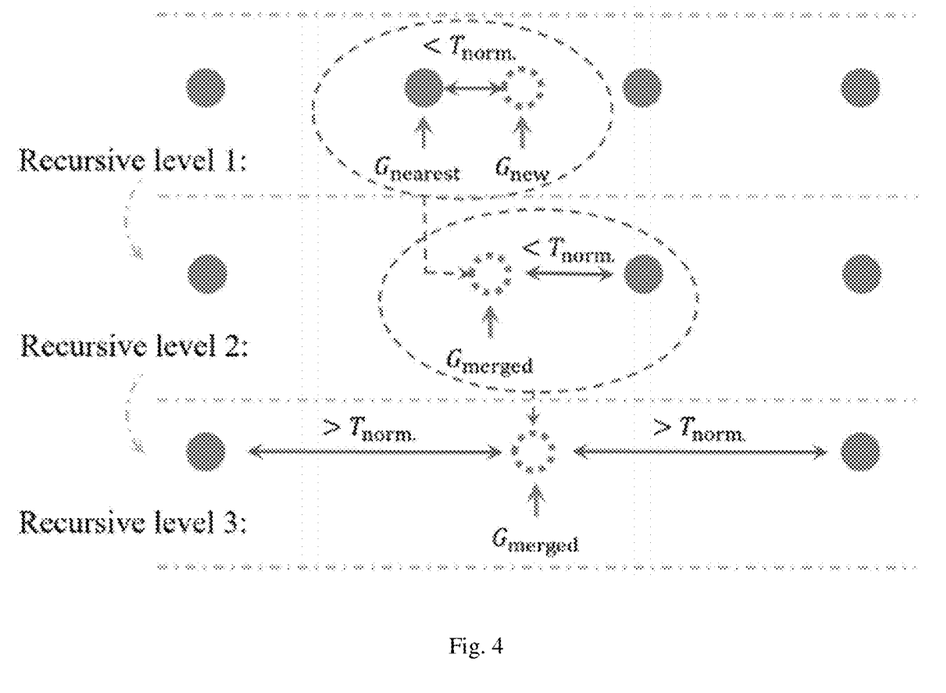
FIG. 4 shows a graphical illustration of an exemplary auto-balanced search tree (AST) algorithm, according to various embodiments of the present disclosure.

According to equation (7), the merging operation will at most occur three times for each searching branch when adding $G_{new}$ into AST, since the distances of nearest nodes in each branch are larger than a threshold. FIG. 4 shows a graphical illustration of an exemplary auto-balanced search tree (AST) algorithm of adding a new item into $N_x$ branch. In FIG. 4, the solid circles represent the current items in AST according to the distinct property. The distance of each pair of solid circles is larger than $T_{norm}$. The dotted line circles represent the items which are going to be added. When the distinct property is broken by adding a new item, Algorithm 3 will delete its nearest item and then recursively add the merged one until the distinct property is recovered. In conclusion, the recursive depth of Algorithm 3 is a constant number, i.e., its complexity is $O(\log(|AST|))$. Therefore, the overall running time of Algorithm 2 is $O(|R|\log(|R|))$.

After the clustering step, the plane proposals based on the distinct region groups are obtained. In this step, these proposals can be verified by region growing. Once this procedure is finished, the pixel-wise segmentation and inlier points statistics are produced simultaneously. The algorithm finally outputs those proposals supported by a large amount of inliers. The detail of this step is summarized in Algorithm 5.

Experiment Evaluation

In some embodiments, the disclosed algorithm can be evaluated in two aspects: effectiveness and efficiency. For effectiveness evaluation, the data from the FARO laser scanner is used. The laser scanner can produce a 360-degree colorful point cloud for both indoor and outdoor circumstances. In order to compare with AHC, the original scan output is reordered to 512×512 depth images. For efficiency evaluation, the disclosed algorithm is implemented in C++ with open source libraries such as PCL and Eigen. All experiments may be performed on a desktop PC with an Intel Core i7-6950X CPU of 3.0 GHz and DDR4 RAM of 128 GB. Parallel technical such as OpenMP, OpenCL, and CUDA may not be used. The parameters used for all experiments are shown in TABLE 1.

TABLE 1

The table of parameters used in this application (the unit of depth image is mm (millimeter))

| PRM | Value | PRM | Value | PRM | Value |
| --- | --- | --- | --- | --- | --- |
| $T_{smooth}$ | 0.015 [13] | $T_{cuv}$ | 0.01 | $T_{norm.}$ | $\sin\frac{5\pi}{180}$ |
| $T_{minSize}$ | 3 pixels | $T_\sigma$ | $1.6 \times 10^{-8}$ | $T_{dist}$ | 30 |
| $T_{MSE}$ | $(T_\sigma \times z^2 + T_\varepsilon)^2$ [4] | $T_\varepsilon$ | 0.1 | $T_{inlier}$ | 20 |

Figure 6:
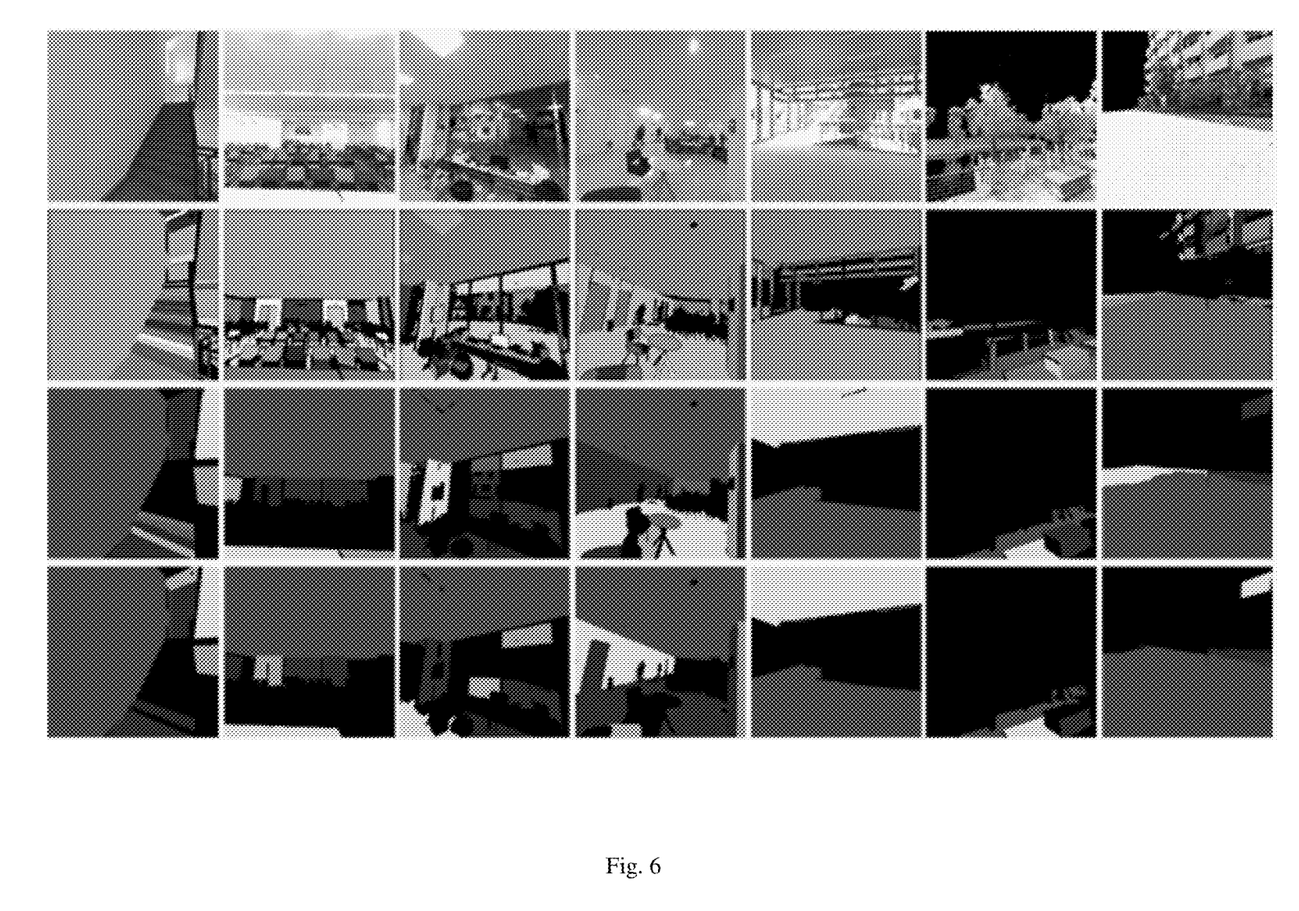
FIG. 6 shows a graphical illustration of exemplary dynamic scenes, according to various embodiments of the present disclosure.

In some embodiments, the effectiveness is evaluated in terms of robustness and accuracy. To evaluate the robustness of the disclosed algorithm, a dataset with 1112 512×512 depth images is built under highly dynamic scenes such as staircase, corridor, room, and campus. The qualitative comparisons are shown in FIG. 6. In FIG. 6, the first row shows the RGB images. The second row shows the plane detection results generated by the algorithm of this disclosure. The third row shows the result from the AHC, in which the initial block size is 4×4. The last row shows the result from the AHC, in which the initial block size is 10×10.

For accuracy evaluation, a sequence of depth images (226 frames) from the staircase (see FIG. 7) are labeled. Using the same terminology, detected planes are classified into 5 types: correct detection, over-segmentation, under-segmentation, missed and noise. The overall quantitative results are summarized in TABLE 2.

TABLE 2

The quantitative results on staircase sequence data set. The terminologies we used are from [5], however the evaluate metrics are slightly modified by allowing disconnected regions. The overlapping threshold is 80%.

| Method | GT regions | Correct detection | Over-segmented | Under-segmented | Missed | Noise |
|---|---|---|---|---|---|---|
| ICRA'14(4 × 4) [4] | 19.60 | 3.40(17.29%) | 0.39 | 0.28 | 16.04 | 2.20 |
| ICRA'14(10 × 10) [4] | 19.60 | 3.29(16.77%) | 0.03 | 0.54 | 16.31 | 1.12 |
| Ours | 19.60 | 12.17(62.08%) | 0.12 | 0.90 | 7.38 | 4.69 |

Figure 7:
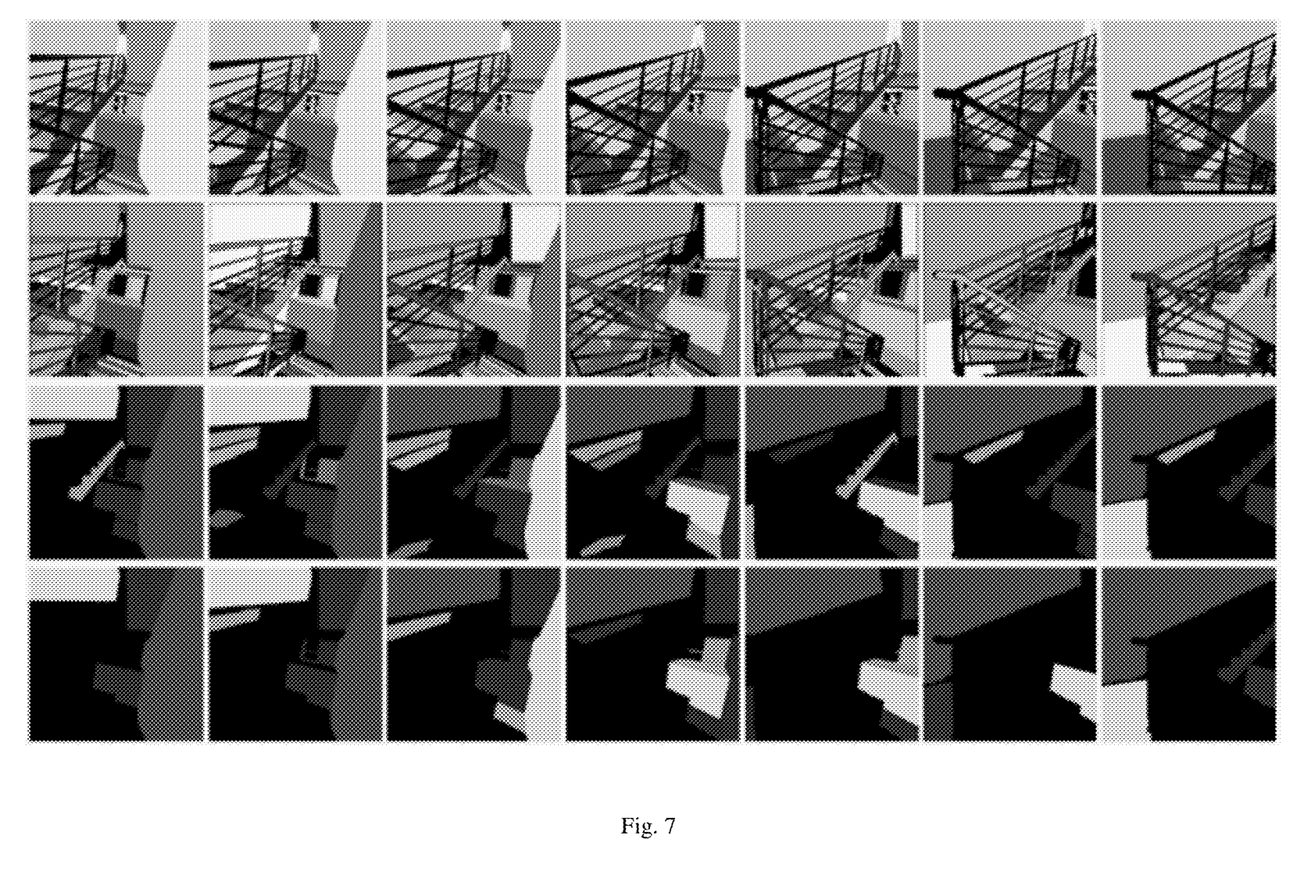
FIG. 7 shows a graphical illustration of exemplary frames from the staircase sequence dataset, according to various embodiments of the present disclosure.

Based on the results in FIG. 6, FIGS. 2A-2E, and Table 2, the disclosed algorithm can effectively detect multiple scale planes. Comparing to current techniques, the quality of results obtained by the disclosed systems and methods are much better, as shown in FIG. 7. In FIG. 7, the first row shows the ground truth segmentation results from human labeling. The second row shows the results from the algorithm of this disclosure. The third row shows the result from the AHC, in which the initial block size is 4×4. The last row shows the result from the AHC, in which the initial block size is 10×10.

Figure 5:
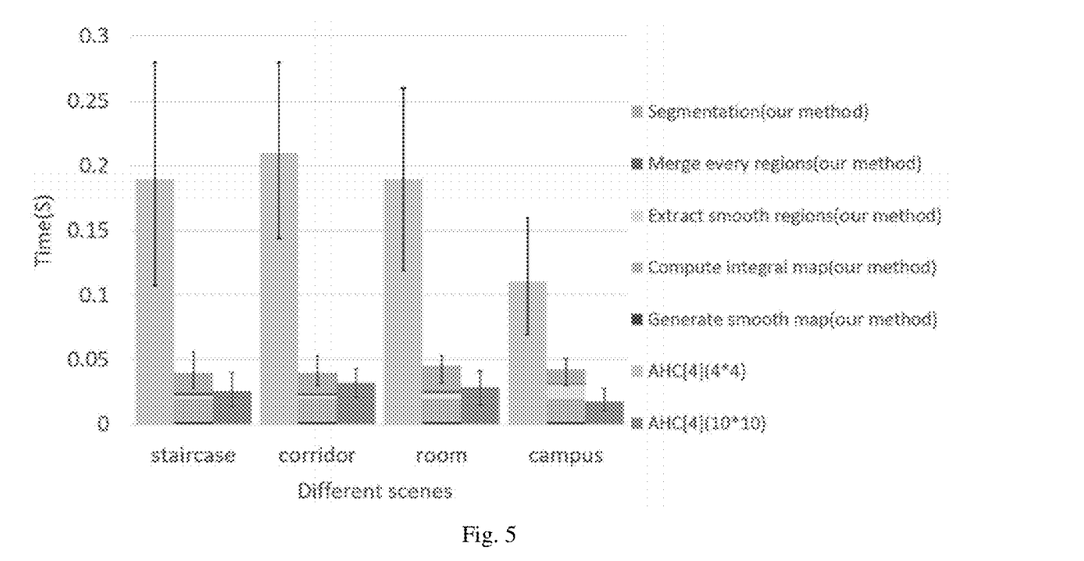
FIG. 5 shows a graphical illustration of computation time comparison, according to various embodiments of the present disclosure.

In some embodiments, the running time of the disclosed method is compared with the fastest existing method on previously mentioned datasets. The initial block size of is tuned to as 4×4. For reference, its result is also given under 10×10. The detail results are shown in FIG. 5. In FIG. 5, the value of each bar represents the average processing time, and the minimum and maximum time are shown by black line segments. As shown in FIG. 5, the disclosed method has a similar worst-case running time with AHC (block size: 10×10). However, considering the fact that the minimum region size used is 3×3, the disclosed algorithm runs an order of magnitude faster than AHC under similar detail level settings (block size 4×4).

Figure 8:
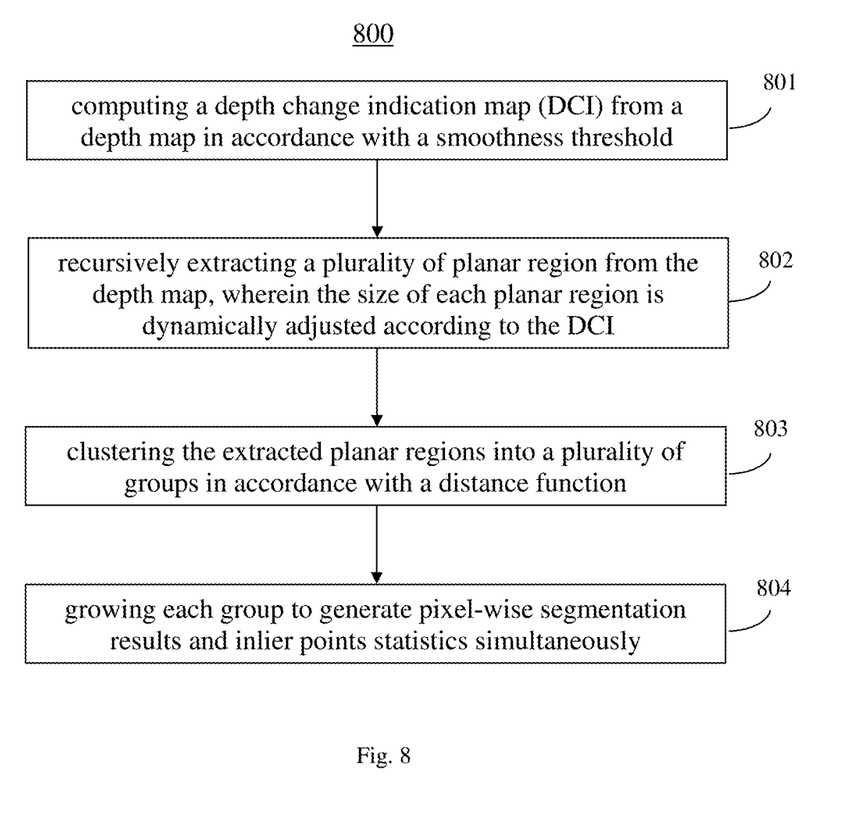
FIG. 8 shows a flow diagram of an exemplary method for extracting planar surface from depth image, according to various embodiments of the present disclosure.

FIG. 8 is a flow diagram of an exemplary method 800 for extracting planar surface from a depth image, according to various embodiments of the present disclosure. The exemplary method 800 may be implemented by one or more components of a system for extracting planar surface from a depth image. The system may comprise a processor coupled to a non-transitory computer-readable storage medium (e.g., memory). The memory may store instructions that, when executed by the processor, cause the processor to perform various steps and methods (e.g., various algorithms) described herein. The exemplary method 800 may be implemented by multiple systems similar to the exemplary system 800. The operations of method 800 presented below are intended to be illustrative. Depending on the implementation, the exemplary method 800 may include additional, fewer, or alternative steps performed in various orders or in parallel.

At block 801, a depth change indication map (DCI) is computed from a depth map in accordance with a smoothness threshold. This step may correspond to FIG. 2B described above. At block 802, a plurality of planar region is recursively extracted from the depth map, wherein the size of each planar region is dynamically adjusted according to the DCI. This step may correspond to FIG. 2C described above. At block 803, the extracted planar regions are clustered into a plurality of groups in accordance with a distance function. This step may correspond to FIG. 2D described above. At block 804, each group is grown to generate pixel-wise segmentation results and inlier points statistics simultaneously. This step may correspond to FIG. 2E described above.

CONCLUSION

As discussed, a new algorithm for fast and robust planar surfaces detection is disclosed to detect as many planes as possible in real-time. A novel recursive planar region extraction algorithm is first disclosed. By dynamically adjusting the region size, the algorithm can significantly reduce the number of planar regions extracted without losing any useful information and harming the time complexity. A novel clustering algorithm that can overcome the plane splitting problem caused by occlusion is also disclosed. In order to reduce the clustering complexity, an auto-balanced search tree that can speed up the clustering algorithm to log-linear time is designed. Finally, the pixel-wise segmentation results are achieved by growing each clustered planar region group. The disclosed algorithms are evaluated through theoretical analysis and comprehensive experiments. From a theoretical standpoint, a detail analysis of correctness and time complexity is performed for each disclosed algorithm. From a practical standpoint, comprehensive experiments are conducted on a highly dynamic scene dataset (1112 frames) and a sequence dataset of staircase scenes (226 frames) with human labeled ground truth. Experiments show that the disclosed algorithms can effectively detect multiple planes at 25 Hz for 512×512 depth images.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or devices, such as a computer-based system, processor-containing system, or other systems that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer-readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present disclosure are merely preferred embodiments and are not intended to limit the scope of the present disclosure, which includes any modification, equivalent, or improvement that does not depart from the spirit and principles of the present disclosure.

The invention claimed is:

1. A method of imaging processing for extracting a plurality of planar surfaces from a depth map, comprising:
computing a depth change indication map (DCI) from a depth map in accordance with a smoothness threshold;
recursively extracting a plurality of planar region from the depth map, wherein the size of each planar region is dynamically adjusted according to the DCI;
clustering the extracted planar regions into a plurality of groups in accordance with a distance function; and
growing each group to generate pixel-wise segmentation results and inlier points statistics simultaneously.

2. The method of claim 1, wherein each planar region comprises a rectangular area in the depth map.

3. The method of claim 1, further comprising computing a plane normal and a plane distance for each planar region.

4. The method of claim 1, further comprising measuring the smoothness of each planar region using a summed-area table (SAT) on DCI, wherein a mean square error (MSE) of each planar region is less than an MSE threshold ($T_{MSE}$), and a curvature of each planar region is less than a curvature threshold ($T_{cuv}$).

5. The method of claim 1, wherein the distance function comprises a normal threshold ($T_{norm}$) and a distance threshold ($T_{dist}$).

6. The method of claim 1, wherein the plurality of groups comprises a distinct set.

7. The method of claim 1, further comprising clustering the extracted planar regions into a plurality of groups using a designed auto balanced search tree (AST).

8. The method of claim 7, wherein the AST comprises a plurality of branches constructed by a red-black tree.

9. The method of claim 1, wherein the number of groups is minimum, and the total number of pixels to the plurality of groups is maximum, and the plane fitting error is less than a predefined threshold.

10. The method of claim 1, wherein the depth image is obtained from a 3D depth sensor, and the method is performed in real-time.

11. An imaging processing system for extracting a plurality of planar surfaces from a depth map, comprising:
one or more processors; and
a memory storing instructions that, when executed by the one or more processors, cause the system to perform the steps of:
computing a depth change indication map (DCI) from a depth map in accordance with a smoothness threshold;
recursively extracting a plurality of planar region from the depth map, wherein the size of each planar region is dynamically adjusted according to the DCI;
clustering the extracted planar regions into a plurality of groups in accordance with a distance function; and
growing each group to generate pixel-wise segmentation results and inlier points statistics simultaneously.

12. The system of claim 11, wherein each planar region comprises a rectangular area in the depth map.

13. The system of claim 11, wherein the steps performed by the system further comprises computing a plane normal and a plane distance for each planar region.

14. The system of claim 11, wherein the steps performed by the system further comprises measuring the smoothness of each planar region using a summed area table (SAT) on DCI, wherein a mean square error (MSE) of each planar region is less than an MSE threshold ($T_{MSE}$), and a curvature of each planar region is less than a curvature threshold ($T_{cuv}$).

15. The system of claim 11, wherein the distance function comprises a normal threshold ($T_{norm}$) and a distance threshold ($T_{dist}$).

16. The system of claim 11, wherein the plurality of groups comprises a distinct set.

17. The system of claim 11, wherein the steps performed by the system further comprises clustering the extracted planar regions into a plurality of groups using a designed auto balanced search tree (AST).

18. The system of claim 17, wherein the AST comprises a plurality of branches constructed by a red-black tree.

19. The system of claim 11, wherein the number of groups is minimum, and the total number of pixels to the plurality of groups is maximum, and the plane fitting error is less than a predefined threshold.

20. The system of claim 11, wherein the depth image is obtained from a 3D depth sensor, and the method is performed in real-time.

* * * * *